United States Patent
Irving, Jr.

[11] 3,780,801
[45] Dec. 25, 1973

[54] MATERIAL FEEDING APPARATUS
[75] Inventor: Edgar W. Irving, Jr., Somerville, N.J.
[73] Assignee: Egan Machinery Company, Somerville, N.J.
[22] Filed: Jan. 29, 1973
[21] Appl. No.: 327,641

[52] U.S. Cl................ 165/120, 100/145, 100/191
[51] Int. Cl................................................ F28f 5/06
[58] Field of Search ................ 165/87, 120; 259/9, 259/10, 25, 26, 191; 100/173, 188, 185, 145; 222/240

[56] References Cited
UNITED STATES PATENTS
2,943,845  7/1960  Jaklitsch ........................... 165/120
3,728,053  4/1973  Stillhard et al. ................ 259/191 X Primary Examiner—Charles J. Myhre
Assistant Examiner—Theophil W. Streule, Jr.
Attorney—David A. Verner

[57] ABSTRACT

Feeding apparatus, especially for plastics extruders, for particulate materials which are difficult or impossible to feed with known feeders due to the materials being tacky and heat sensitive. A reciprocating sleeve in the feed inlet to the extruder provides a means of breaking up agglomerates of materials and preventing the bridging of the feed inlet caused by such agglomeration.

5 Claims, 2 Drawing Figures

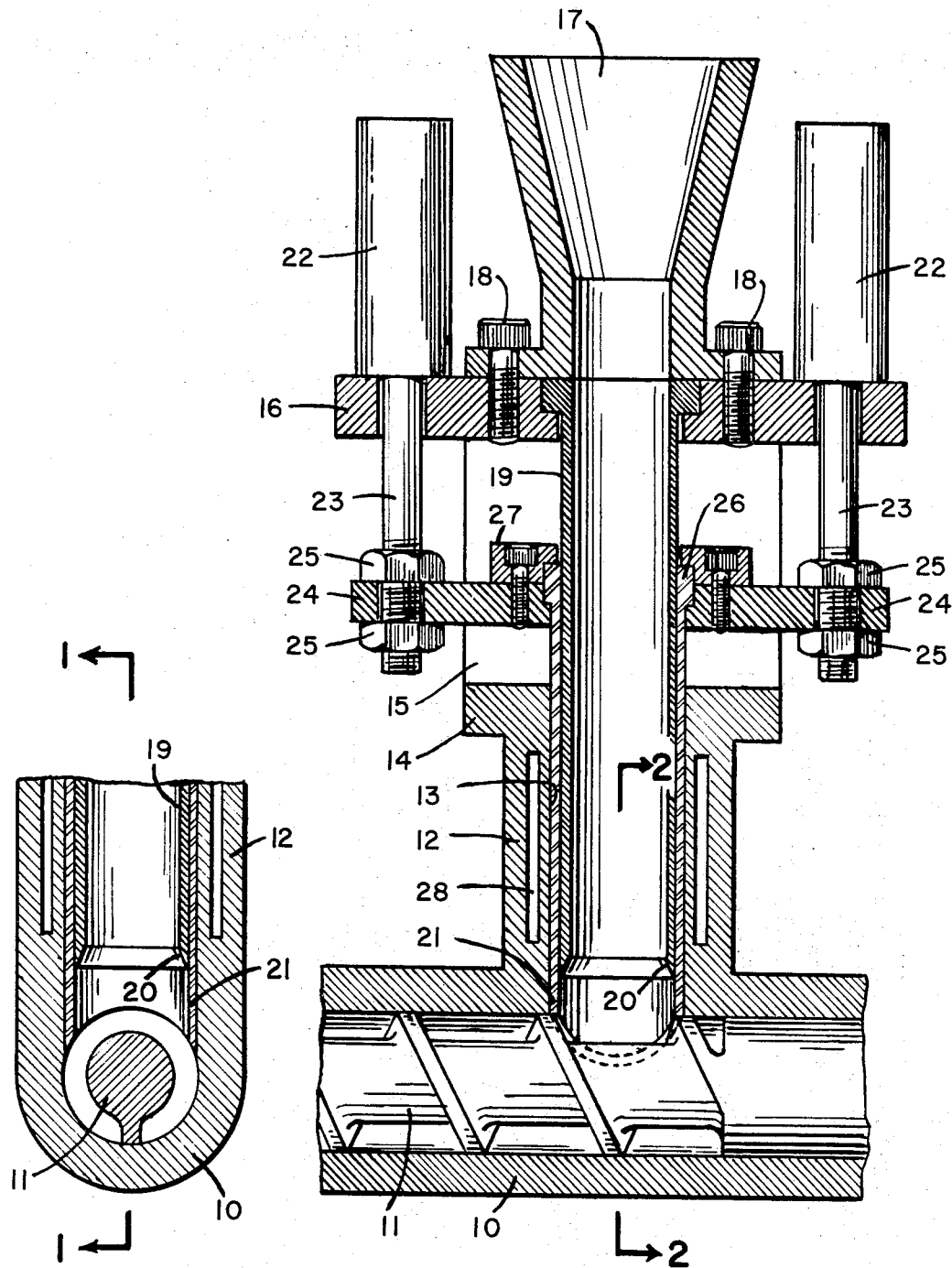

MATERIAL FEEDING APPARATUS

BACKGROUND OF THE INVENTION

This invention relates to apparatus for feeding solid particulate material to processing machinery and in particular to such apparatus that will satisfactorily and continuously feed materials which heretofore have been extremely difficult or impossible to feed. The invention is described herein in connection with the feeding of materials to a plastics extruder but, as will become evident to those skilled in the material feeding art, the invention may be used to advantage to feed materials to processing machinery other than plastic extruders and the invention is not limited thereto.

Plastic materials, such as polyethylene and polypropylene, in the physical form of pellets or granules are usually satisfactorily fed to an extruder by means of a simple gravity type hopper placed above the feed opening of the extruder. Modifications to the hopper are required to feed some other plastics or other physical forms of plastics and these modifications often comprise the use of a rotating feed screw and/or rotating blades, stirrers, etc. in the hopper. Devices of these types are disclosed in U.S. Pat. Nos. 2,369,359; 3,008,184; 3,177,527; 3,193,601; 3,307,748 and 3,559,240. However, it has been found that none of these nor any of other known types of feeders are suitable for feeding certain of the materials or mixtures of plastic materials that are loosely classified as "hot melts." As used herein, hot melts refer to materials or mixtures of materials that are, at normal ambient temperatures, in the form of solid particles and which may be transformed by heat and/or mechanical working to a molten condition in the extruder. Some of these hot melts, such as various resins and rubbery materials, are somewhat sticky or tacky at normal ambient temperatures and tend to agglomerate with the application of even light pressures and/or elevated temperatures. In addition, the particle sizes vary over a wide range in the same batch of material due to unavoidable limitations in the manufacturing process and usually a considerable percentage of fines are present. Due to the above, the use of the gravity type hopper alone results in agglomeration of the materials in the vicinity of the intersection of the feed inlet to the extruder and the extruder barrel bore, resulting in bridging of the material in the feed inlet and consequent loss of feed.

SUMMARY OF THE INVENTION

The present invention provides apparatus interposed between the feed hopper or other source of material and the extruder or other processing machine and extending into the feed inlet of the processing machine which continuously eliminates or breaks up the agglomeration of particles at the critical area of introduction of the materials into the conveyor screw or other device of a processing machine. The apparatus comprises a reciprocating sleeve interposed between the bore of the feed inlet to the processing machine and the feed tube from the feed source. The feed tube is terminated, in an extruder, at some distance above the barrel bore and extruder screw, while the sleeve at its lowest position extends to and substantially conforms to the shape of the barrel bore at its intersection with the feed bore. Vertical reciprocation of the sleeve between this lowest position and a higher one, preferably at or above the level of the termination of the feed tube, alternately enlarges and contracts the diameter of the feed inlet bore adjacent to its intersection with the barrel bore and breaks up any bridging of the materials which may occur in this area, thus providing a continuous and substantially constant feed.

BRIEF DESCRIPTION OF THE DRAWINGS

FIG. 1 is a partial section view taken through the feed section of a plastics extruder and the feeding apparatus.

FIG. 2 is a partial section view taken through the line 2 of FIG. 1.

DESCRIPTION OF PREFERRED EMBODIMENT

The drawings show sections through the barrel of a conventional plastics extruder in the vicinity of the material feed section of the extruder. Extruder barrel 10 encases rotating extruder screw 11 which accepts the feed material and conveys it from the feed section, melts and mixes the material and forces it through the extruder discharge, not shown, in a molten condition. The feed inlet section is formed by upstanding cylindrical housing 12 (which may be part of the barrel as shown or may be a separate piece bolted to the barrel) and having a bore 13 intersecting the bore of the barrel and through which the material is fed. A flange 14 atop the feed inlet section provides a support for spacers 15, one shown, which support hopper mounting plate 16 to which the feed hopper 17 is bolted by bolts 18. Hopper 17 may be of any of the known types, having a bottom circular outlet and may, if desired, have a material cutoff valve near the vicinity of the outlet.

Abutting the bottom of the hopper and in line with the hopper outlet is feed tube 19 supported by a flange on its upper end fitted into a counter bore in the hopper mounting plate 16. The feed tube extends downwardly partially into the feed inlet bore 13, the lower end of the tube being some distance from the intersection of the barrel and feed inlet bores. An internal chamfer or taper 20 is provided on the lower end of the feed tube.

Slidably interposed between the feed inlet bore 13 and the internal feed tube 19 is reciprocating sleeve 21 extending, when in its lowest position, to or close to the intersection of the barrel and feed inlet bores. The bottom end of the sleeve 21 is preferably contoured to substantially match the bore of the extruder barrel when the sleeve is in its lowest position as shown in FIG. 2. Sleeve 21 is caused to reciprocate vertically by fluid cylinders 22 mounted to the hopper mounting plate 16, and having their piston rods 23 attached to sleeve supporting plate 24 by means of adjusting nuts 25. The sleeve 21 is provided with a flange 26 at its upper end which is held in a counter-bore in the sleeve supporting plate by sleeve clamp plate 27.

In operation, the plastic or hot melt material is loaded into hopper 17 and falls by gravity downward through feed tube 19 to the barrel bore and is engaged by the rotating screw 11 and conveyed toward the discharge end of the extruder. However, due to mechanical working of the material by the screw in the feed section and to the tackiness of many of the feed materials, these materials tend to agglomerate in the feed inlet directly above the screw, causing bridging of the feed inlet and consequent stoppage of feed to the screw. By moving the sleeve 21 upwards beyond the lower end of the feed tube 19, the inlet bore is enlarged, allowing the bridged material to drop into the barrel bore and be conveyed away by the screw. In ordinary operation, the sleeve is reciprocated continuously at rates determined empirically to give the best results. A rate too fast will cause frictional heat to be built up in the feed inlet, resulting in agglomeration of the heat sensitive materials, while a rate that is too slow will allow excessive bridging to build up and result in intermittent feed. Successful operation has been accomplished by reciprocating the sleeve at two strokes per minute, but the optimum rate will vary widely according to the character of the feed material and other factors.

The action of the fluid cylinders 22 can be controlled by conventional means well known in the art.

The sleeve 21 is preferably made of a material having a low coefficient of friction and having antistick properties. The material found most satisfactory for this purpose is aluminum.

In order to maintain a low temperature in the feed inlet, the feed inlet section may be cooled by introducing a cooling medium into jackets 28 surrounding the feed inlet. Heat introduced into the feed materials by mechanical working can thus be removed before the temperature of the feed material rises to the point where the material will agglomerate.

I claim:

1. Feeding apparatus for solid particulate material interposed and supported between a feed source and a plastics extruder located below the source, the extruder having a feed inlet with a bore intersecting the extruder barrel bore, the feeding apparatus comprising:
    tubular feed conduit means extending downwardly from the source into the feed inlet bore and terminating at a distance from the barrel bore;
    a tubular sleeve slidably interposed between the tubular feed conduit means and the feed inlet bore and terminating at its lowest position substantially at the barrel bore; and
    means to reciprocate the tubular sleeve between its lowest position and a higher position.

2. The feeding apparatus of claim 1 wherein the tubular sleeve is reciprocated between its lowest position and a higher position where the termination of the sleeve is above the termination of the feed conduit means.

3. The feeding apparatus of claim 1 wherein the termination of the tubular sleeve conforms substantially in shape to the barrel bore.

4. The feeding apparatus of claim 3 wherein cooling means are provided to control the temperature of the feed inlet.

5. The feeding apparatus of claim 4 wherein the tubular sleeve is made of aluminum.

* * * * *